(12) United States Patent
Winzer et al.

(10) Patent No.: US 9,910,234 B2
(45) Date of Patent: Mar. 6, 2018

(54) DATACENTER INTERCONNECTION SYSTEM

(71) Applicant: Alcatel-Lucent USA Inc., Murray Hill, NJ (US)

(72) Inventors: Peter J Winzer, Aberdeen, NJ (US); David T Neilson, Old Bridge, NJ (US); Roland Ryf, Aberdeen, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 15/178,432

(22) Filed: Jun. 9, 2016

(65) Prior Publication Data

US 2016/0365926 A1 Dec. 15, 2016

Related U.S. Application Data

(60) Provisional application No. 62/173,059, filed on Jun. 9, 2015.

(51) Int. Cl.
| | |
|---|---|
| *G02B 6/12* | (2006.01) |
| *G02B 6/43* | (2006.01) |
| *H04B 10/61* | (2013.01) |
| *G02B 6/293* | (2006.01) |
| *H04B 10/2587* | (2013.01) |
| *H04B 10/40* | (2013.01) |
| *H04J 14/02* | (2006.01) |

(52) U.S. Cl.
CPC ............ *G02B 6/43* (2013.01); *G02B 6/12* (2013.01); *G02B 6/2938* (2013.01); *H04B 10/2587* (2013.01); *H04B 10/40* (2013.01); *H04B 10/61* (2013.01); *H04J 14/02* (2013.01); *G02B 2006/1215* (2013.01); *G02B 2006/12142* (2013.01)

(58) Field of Classification Search
CPC ............................................. G02B 2006/12142
See application file for complete search history.

(56) References Cited

U.S. PATENT DOCUMENTS

| | | | |
|---|---|---|---|
| 7,072,584 B1 | 7/2006 | Lichtman et al. | |
| 7,209,657 B1 | 4/2007 | Islam | |
| 8,401,399 B2 * | 3/2013 | Barton | H04B 10/505 |
| | | | 398/184 |
| 8,582,933 B2 * | 11/2013 | Ryf | H04B 10/2581 |
| | | | 385/29 |
| 8,913,899 B2 * | 12/2014 | Neilson | H04B 10/2587 |
| | | | 398/140 |
| 2012/0141140 A1 | 6/2012 | Neilson et al. | |

(Continued)

*Primary Examiner* — Rhonda Peace
(74) *Attorney, Agent, or Firm* — Andrew R. Ralston

(57) ABSTRACT

An optical line card includes a plurality of coherent receivers and a plurality of optical modulators. The coherent receivers are each configured to receive a corresponding channel of a received optical superchannel. The optical modulators are each configured transmit a corresponding channel of a transmitted optical superchannel. Each of a plurality of optical splitters is configured to receive a corresponding one of a plurality of unmodulated optical signals from an optical source external to the line card. Each splitter directs a first portion of light received by that splitter to a corresponding one of the coherent receivers, and a second portion of light received by that splitter to a corresponding one of said optical modulators.

16 Claims, 7 Drawing Sheets

(56) References Cited

U.S. PATENT DOCUMENTS

2012/0189303 A1 7/2012 Winzer et al.
2013/0064512 A1 3/2013 Ghantiwala
2016/0057516 A1 2/2016 Hochberg et al.
2016/0365926 A1* 12/2016 Winzer ................ H04B 10/27

* cited by examiner

DATACENTER INTERCONNECTION SYSTEM

CROSS-REFERENCE TO RELATED APPLICATIONS

This application claims the benefit of U.S. Provisional Application Ser. No. 62/173,059 filed on Jun. 9, 2015, commonly assigned with this application and incorporated herein by reference.

TECHNICAL FIELD

The present disclosure relates generally to the field of optical communications, and, more particularly, but not exclusively, optical data communication, e.g. to methods and apparatus useful for interconnection of transmitting and receiving datacenter nodes.

BACKGROUND

This section introduces aspects that may be helpful to facilitate a better understanding of the inventions. Accordingly, the statements of this section are to be read in this light and are not to be understood as admissions about what is in the prior art or what is not in the prior art.

Advances in data communication have led to the emergence and growth of data centers for the storage of information, such datacenters being a component of centralized storage sometimes colloquially referred to as "the cloud". Increasing reliance on such centralized storage by businesses and individuals is expected to require new strategies for interconnection of optical communication nodes to, e.g. reduce costs and increase data capacity. Such datacenters are therefore expected to require massive metro-area interconnection bandwidths in the near future, e.g. on the order of several thousand 100G point-to-point connections over distances of ~100 km. Low-cost plug-and-play architectures for this market are therefore essential to support such growth in data transmission capacity.

SUMMARY

The inventors disclose various apparatus and methods that may be beneficial applied to transmission and reception of optical communications signals. While such embodiments may be expected to provide improvements in performance and/or reduction of cost of such apparatus and methods, no particular result is a requirement of the present invention unless explicitly recited in a particular claim.

One embodiment provides an optical line card that includes a plurality of coherent receivers, and a plurality of optical modulators. The coherent receivers are each configured to receive a corresponding channel of a received optical superchannel. The optical modulators are each configured transmit a corresponding channel of a transmitted optical superchannel. Each of a plurality of optical splitters is configured to receive a corresponding one of a plurality of unmodulated optical signals from an optical source external to the line card. Each splitter directs a first portion of light received by that splitter to a corresponding one of the coherent receivers, and a second portion of light received by that splitter to a corresponding one of the optical modulators.

Some embodiments include a processor configured to receive demodulated data from the coherent receivers and to provide data to the optical modulators. In some embodiments the coherent receivers are configured to receive the optical superchannel from a demultiplexer having overlapping transmission bands. In such embodiments the transmission bands may have a −6 dB bandwidth of at least about 150% of a spacing of the transmission bands. In some embodiments a wavelength of operation of the modulators and coherent receivers is determined by a software-defined network (SDN) control plane.

Another embodiment provides a system, e.g. a node of an optical communication system. The system includes a plurality of optical line cards and at least two optical sources. Each of the line cards is configured to receive a corresponding one of a plurality of unmodulated (CW) optical signals, each CW optical signal having a different wavelength. Each of the at least two optical sources is configured to produce the plurality of CW optical signals. An optical multiplexer is configured to direct the output of a selected one of the at least two optical sources to the plurality of line cards, thereby providing redundancy of the plurality of optical signals.

Some embodiments of the system also include a selector configured to operate the optical multiplexer to select a different one of the at least two optical sources in the event that an initial one of the at least two optical sources fails to operate properly. In some embodiments the selector operates based on a measurement of optical power from the optical multiplexer. In some embodiments the selector operates based on a measurement of a modulated optical signal produced by one or more of the optical line cards. In some embodiments an SDN control plane operates as the selector.

Another embodiment provides a system, e.g. a node of an optical communication system. The system includes a plurality of optical line cards and a commons module. Each of the line cards is configured to receive a corresponding one of a plurality of CW optical signals, each CW optical signal having a different corresponding wavelength. Each line card is also configured to receive a plurality of modulated input optical signals, wherein each of the modulated input optical signals has a nominal center frequency at the corresponding wavelength. Each line card is further configured to generate a plurality of modulated output optical signals, wherein each of the modulated output optical signals has a nominal center frequency at the corresponding wavelength. The commons module is configured to communicate with each of the optical line cards via a corresponding standard interface. The commons module is further configured to provide the plurality of CW optical signals to the line cards, to direct to each of the line cards the corresponding CW optical signal and the plurality of modulated input optical signals, and to receive the plurality of modulated output signals from the line cards.

Another embodiment provides an apparatus, e.g. a commons module, that includes an optical signal source, and first and second multiplexers/demultiplexers. The optical source is configured to produce a plurality N of optical signals each having a different wavelength. The first multiplexer is configured to separate a received spatial superchannel into N groups of received data signals, each of the received data signals in a same group having a same wavelength. The second multiplexer configured to combine N groups of transmitted data signals into a transmitted spatial superchannel, the transmitted signals in each of the N groups having the same wavelength. An interface port is configured to provide, to each of N optical line cards that lack an on-board optical source, a corresponding one of the optical signals and a corresponding one of the N groups of received data signals. The interface port is further configured to receive, from each of N optical line cards, a corresponding one of the N groups of transmitted data signals.

In some embodiments of the apparatus, the interface is configured to provide optical signals to and receive optical signals from each optical line card via an optical array connector. In some embodiments the first multiplexer is configured to wavelength demultiplex K sets of N channels, K>1, to K sets of N channels at each different wavelength.

Another embodiment provides a method, e.g. for manufacturing a hub of an optical communication system. The method includes configuring on an optical line card each of a plurality of coherent receivers to receive a corresponding channel of a received optical superchannel. Each of a plurality of optical modulators on the line card is configured to transmit a corresponding channel of a transmitted optical superchannel. A plurality of optical splitters on the optical line card are configured to receive a corresponding one of a plurality of CW optical signals from an optical source external to the line card, and to direct a first portion of light received by that splitter to a corresponding one of the coherent receivers and a second portion of light received by that splitter to a corresponding one of the optical modulators. Some embodiments further include configuring the optical line card to receive the corresponding channel of the received optical superchannel via an optical wavelength demultiplexer having overlapping transmission bands of optical channels corresponding to the corresponding wavelengths.

Yet another embodiment provides method, e.g. for manufacturing a hub of an optical communication system. The method includes providing a plurality of optical line cards. Each of the optical line cards is configured to receive a corresponding one of a plurality of CW optical signals, wherein each CW optical signal has a different corresponding wavelength. Each of the line cards is further configured to receive a plurality of modulated input optical signals, each of the modulated input optical signals having a nominal center frequency at the corresponding wavelength. Each of the line cards is further configured to generate a plurality of modulated output optical signals, each of the modulated output optical signals having a nominal center frequency at the corresponding wavelength. The method further includes optically coupling the optical line cards to a commons module configured to communicate with each of the optical line cards via a corresponding standard interface to provide the plurality of CW optical signals, to direct to each of the optical line cards the corresponding CW optical signal and the plurality of modulated input optical signals, and to receive the plurality of modulated output signals.

In some embodiments of the method, the commons module includes a multiplexor configured to direct the plurality of modulated input optical signals via an optical wavelength demultiplexer having overlapping transmission bands of optical channels corresponding to the corresponding wavelengths. In some embodiments of the method, the commons module includes: at least two optical sources, each being configured to produce the plurality of CW optical signals; and an optical multiplexer configured to direct the output of a selected one of the at least two optical sources to the plurality of line cards, thereby providing redundancy of the plurality of optical signals.

BRIEF DESCRIPTION OF THE DRAWINGS

A more complete understanding of the present invention may be obtained by reference to the following detailed description when taken in conjunction with the accompanying drawings wherein:

FIGS. 2A-2C illustrate optical line cards according to various embodiments, wherein FIG. 2A illustrates a line card configured to receive and transmit a spatial superchannel of signals each having a same wavelength, FIG. 2B illustrates a line card configured to receive and transmit a spectral superchannel of signals each having different wavelengths, and FIG. 2C illustrates a line card unconstrained by wavelength that may receive and transmit a spatial superchannel or a spectral superchannel;

DETAILED DESCRIPTION

Figure 1:
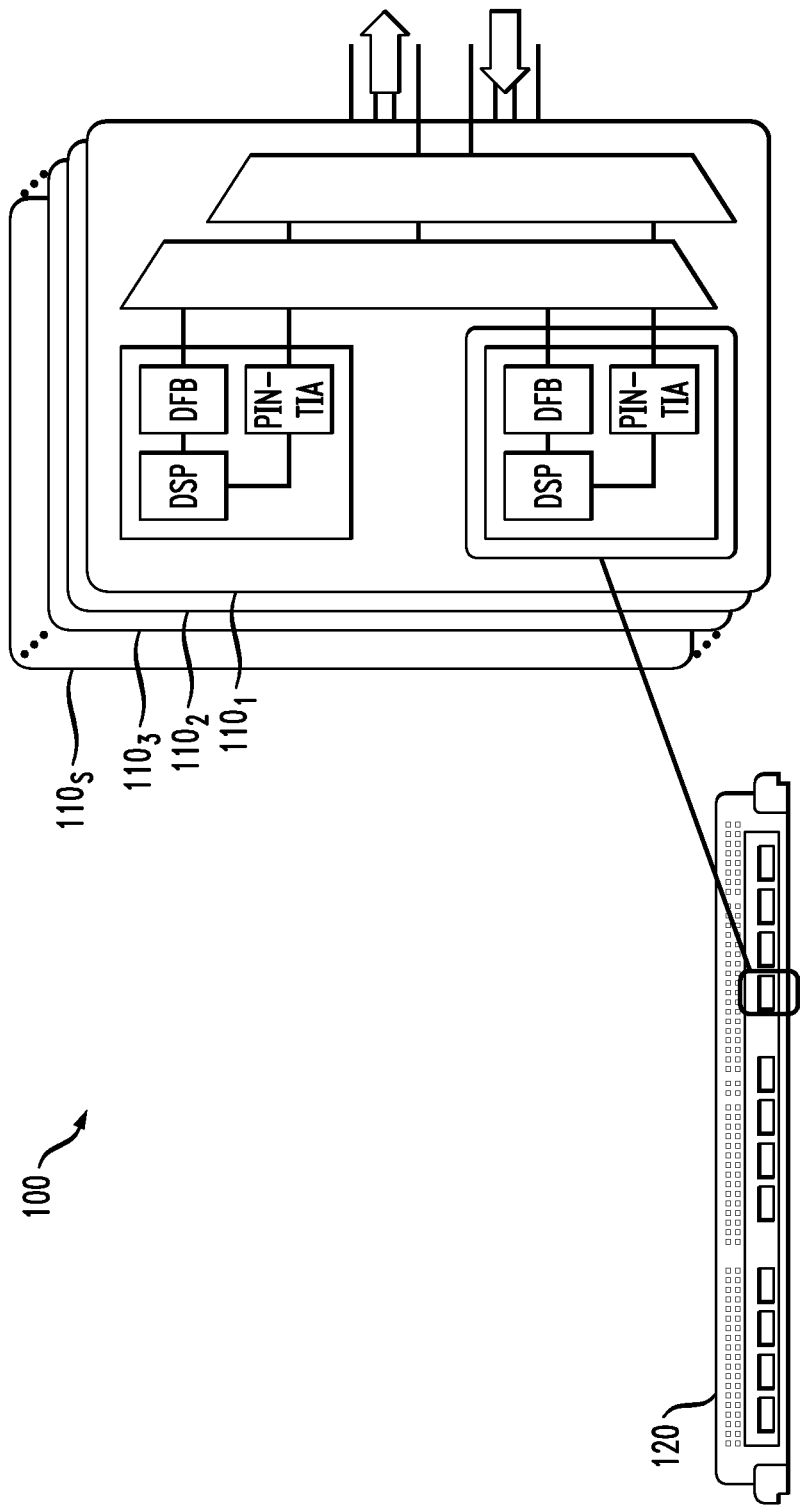
FIG. 1 illustrates aspects of a conventional interconnection system using multiple pluggable interfaces that are wavelength multiplexed onto an optical fiber.

Conventional data centers typically either (a) connect egress routers/switches within the datacenter to metro-DWDM systems via client interfaces, or (b) use a multitude of pluggable or on-board metro-DWDM interfaces to directly connect routers/switches to a WDM line system. An example of the latter case is shown in FIG. 1, which illustrates a conventional system 100 that uses pluggable interfaces, with each of S interfaces $110_1 \ldots 110_S$ serving a single frequency channel and being wavelength multiplexed onto an optical fiber (not shown). The interfaces 110 may be components of, e.g. a 100G communication system. In order to satisfy the capacity needs, a total of S nominally identical parallel systems are used. Each interface 110 typically plugs into a slot in a line card 120, with the line card 120 exemplarily holding 12 such interfaces.

One major drawback of a system architecture such as that of the system 100 includes the colored nature of the pluggable interfaces 110, in that an instance of the interface 110 is needed for each wavelength channel of the system. Thus, when a large number of wavelength channels is needed, each interface 110 must be separately installed and configured with a unique component code. With some systems including as many as 100 different wavelength channels, this duplication of hardware can result in significant cost and redundancy of hardware. Furthermore, the architecture replicates S identical systems in parallel, thereby not leveraging spatial parallelism for cost and power savings. Lastly, pluggable interfaces of this type typically rely on direct detection using modulation schemes such as pulse-amplitude modulation (PAM) or discrete multitone (DMT) modulation, which have limited chromatic dispersion tolerance and typically necessitate optical dispersion compensation to ensure sufficient temporal-spatial alignment of channel wavelengths. Matching the dispersion compensating fiber or gratings to the transmission fiber across the entire system bandwidth represents a challenge which makes such systems difficult to engineer and operate.

The inventors provide embodiments herein that may address various deficiencies of conventional approaches. Some such embodiments employ multi-channel line cards with coherent detection and modulation in a manner that provides compact and efficient nodes of an optical transport system, such as metro-DWDM communication networks.

Figure 2A:
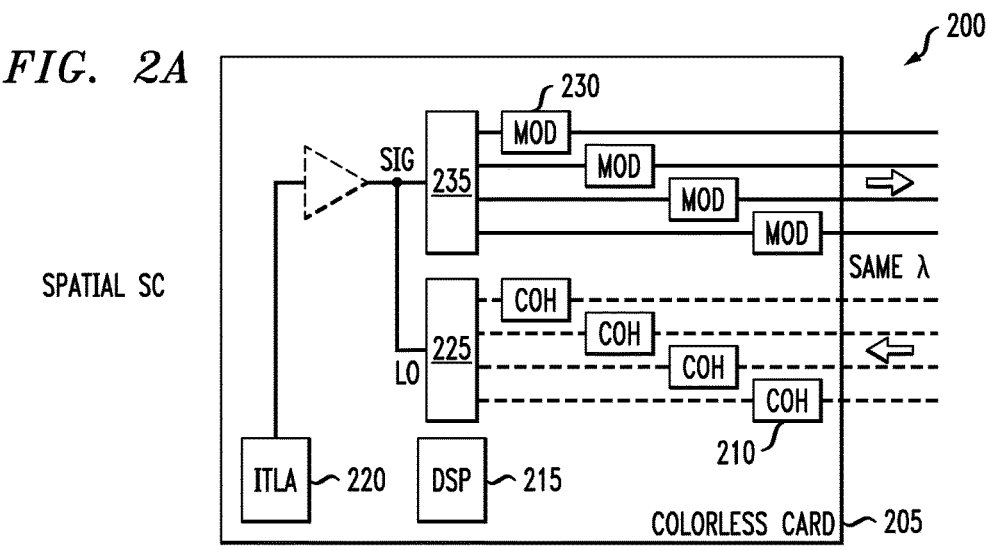
Figure 2B:
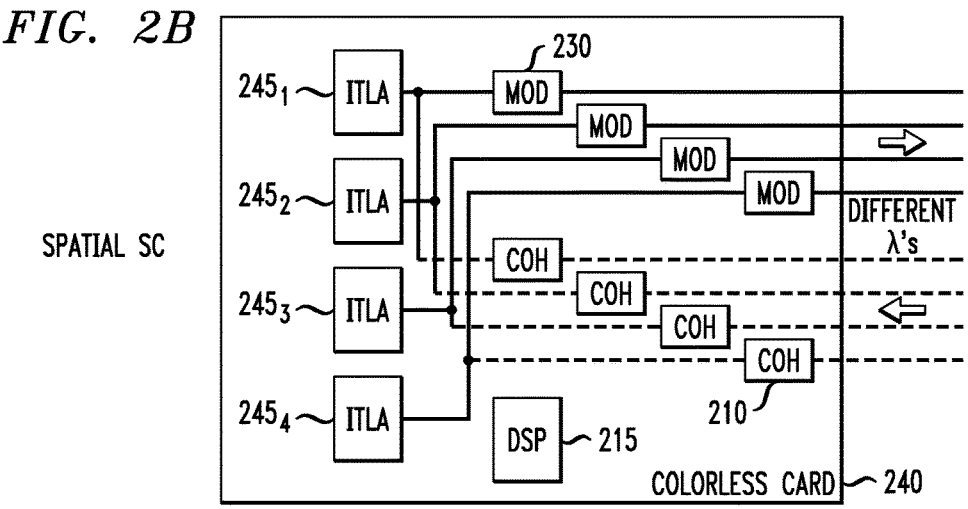
Figure 2C:
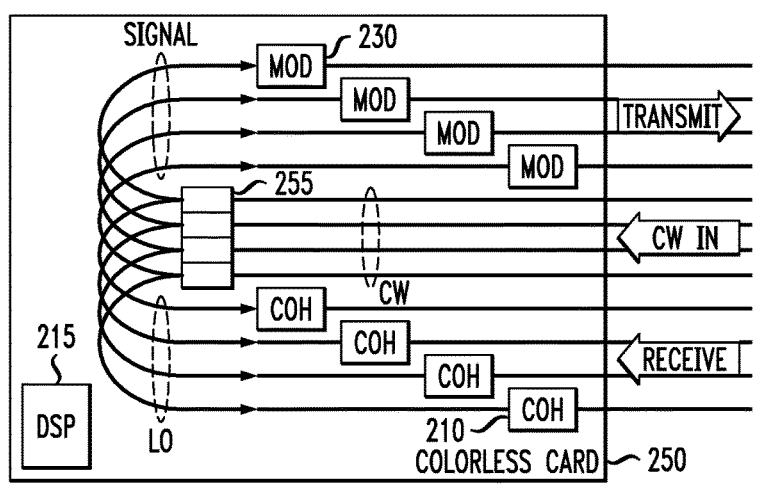

FIGS. 2A-2C illustrate aspects of embodiments of several apparatus, e.g. lines cards 205, 240 and 250. These line cards are "colorless" by which it is meant that the line cards are not constrained to operate at any particular wavelength or wavelengths. Instead the line cards may be configured by one or more tunable on-board or off-board optical sources, e.g. lasers. In FIGS. 2A-2C same-numbered feature references reflect similar functionality of such features, though there is no requirement that such features be functionally identical among different embodiments.

FIG. 2A shows an illustrative example of a line card 205 configured to receive and transmit a number, e.g. four, of optical channels each having a same wavelength. Such channels may be channels of, e.g., a spatial superchannel. Those skilled in the optical communication arts will appreciate that a spatial superchannel may include a plurality of communication channels, nominally having a same wavelength, wherein the channels propagate to the line card 205 along different spatial paths, such as different cores of a multicore optical fiber, different fibers of a fiber ribbon, or different modes of a multimode path. Each of the received channels is directed to a corresponding coherent receiver 210, each of which demodulates its corresponding channel under control of a controller 215, which also receives the demodulated data. Each of the receivers 210 uses a local oscillator (LO) signal provided by an on-board CW (constant wave, e.g. unmodulated) tunable optical source 220, e.g. an ITLA (integrable tunable laser assembly), via a power splitter 225. Each of a number, e.g. four, of modulators 230 also receives a portion of the output of the optical source 220 via a power splitter 235. The splitters 225, 235 are shown as separate devices, while in other embodiments these may be combined into a single device. An optional amplifier 237 may be used to increase the power of the CW signal provided to the modulators 230. While it may be preferable that the number of receivers 210 and modulators 230 be equal, there is no requirement that this be so. The controller 215 provides data to the modulators 230, each of which imparts data onto the corresponding portion of CW light. The modulation is not limited to any particular format, but for example may be 256-QAM. Use of such high-density modulation allows the hardware cost per modulator to be amortized among many bits of information.

FIG. 2B shows a second illustrative example of a line card 240 configured to receive and transmit a number, e.g. four, of optical channels each having a different wavelength. Such channels may be channels of a spectral superchannel. The skilled artisan will appreciate that a spectral superchannel may include a plurality of communication channels, each modulated onto a corresponding carrier wavelength, wherein all the carrier wavelengths may optionally propagate to the line card 240 simultaneously on a single optical path and/or be processed as a group. In similar fashion as described with respect to the line card 205, each of the received channels is directed to a corresponding coherent receiver 210, each of which demodulates its corresponding channel under control of the controller 215. Each of the receivers 210 uses an LO signal provided by a corresponding one of tunable optical sources $245_1 \ldots 245_4$, each of which provides a CW wavelength corresponding to one of the received channel wavelengths. The output of each optical source 245 is divided and also provided to a corresponding one of the modulators 230. As previously described the controller 215 provides data to the modulators 230, each of which imparts data onto the corresponding portion of CW light. In contrast to the embodiment of FIG. 2A, the modulators 230 each output a different wavelength of modulated light, corresponding to the wavelengths of the received channels.

FIG. 2C shows a third illustrative example of a line card 250 configured to receive and transmit a number, e.g. four, of optical channels. In contrast to the line cards 205, 240, there is no optical source on-board the line card 250, and no provision for either spectral or spatial multiplexing. Instead, in addition to received and transmitted optical channels, the line card 250 receives a number of CW optical signals having a wavelength or wavelengths corresponding to the wavelengths of the received optical channels. Each CW signal is directed to a corresponding one of power splitters 255, each of which divides the corresponding CW signal between one of the receivers 210 and one of the modulators 230. If the received CW signals are all at a same wavelength, the line card 250 may operate similarly to the line card 205 to route a spatial superchannel. If instead the received CW signals are all at different wavelengths, the line card 250 may operate similarly to the line card 240 to route a spectral superchannel. In an alternate embodiment, not shown, a single received CW signal may be divided by a 1:8 power splitter to each of the receivers 210 and the modulators 230, optionally using one or more amplifiers to boost the power of the CW signal to the receivers 210 and/or modulators 230.

In each of the line cards 205, 240 and 250 the placement of multiple channels on the same card provides advantageous efficiency relative to conventional implementations. Thus, e.g. the line cards may each provide detection and modulation of each of a number of channels, the number being limited only by practical considerations such as available board area and/or power consumption. A single instance of a line card may replace N conventional line cards 120. In the case of the line card 205, only a single laser light source 220 is needed to provide LO or carrier light to the N channels, while for the line card 240 N laser light sources 245 are used, but the 1:N splitters 225, 235 are eliminated. In the case of the line card 250, the optical source may be flexibly provided depending on system configuration, as described in embodiments below.

Figure 3:
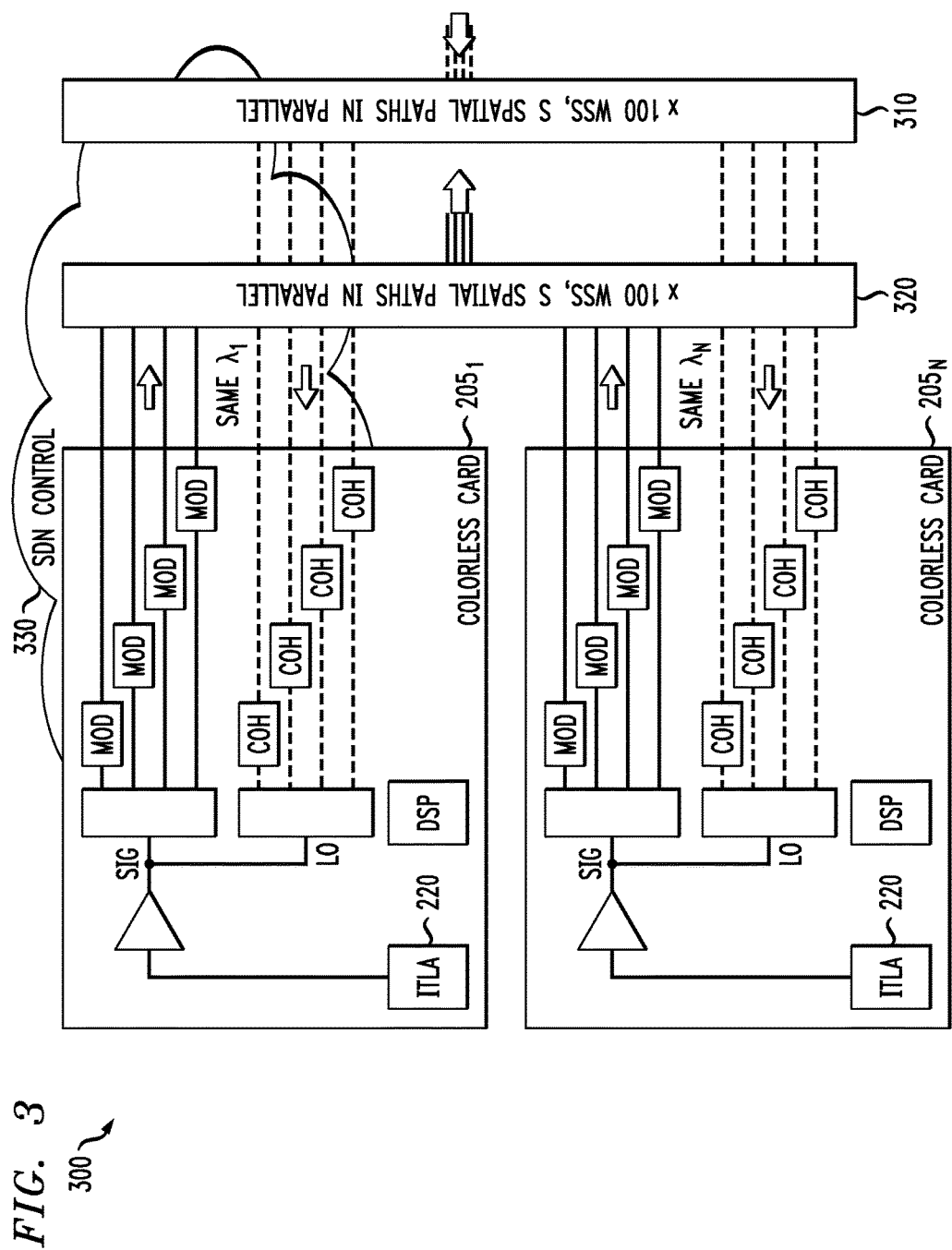
FIG. 3 illustrates an embodiment in which the line cards of FIG. 2A, e.g. are configured to receive modulated optical signals from a wavelength demultiplexer and transmit modulated optical signals to a wavelength multiplexer.

FIG. 3 illustrates an embodiment, e.g. a system 300, that includes N instances of the line card 205 and two wavelength selective switches (WSS) 310, 320. The WSSs 310, 320 may be configured as flexible MUXs, discussed further below. The line cards 205 and switches 310, 320 may be located at, e.g. a node of an optical network such as at a datacenter. The WSS 310 is configured to receive a wavelength-division multiplexed (WDM) spatial superchannel via any suitable spatially diverse path, and to separate the received WDM signal into N superchannels, all the channels in each of the superchannels having a same wavelength. The WSS 320 is configured to receive transmitted spatial superchannels from each of the N line cards 205, and to multiplex the superchannels into a WDM signal to a suitable spatially diverse path.

Figure 4A:
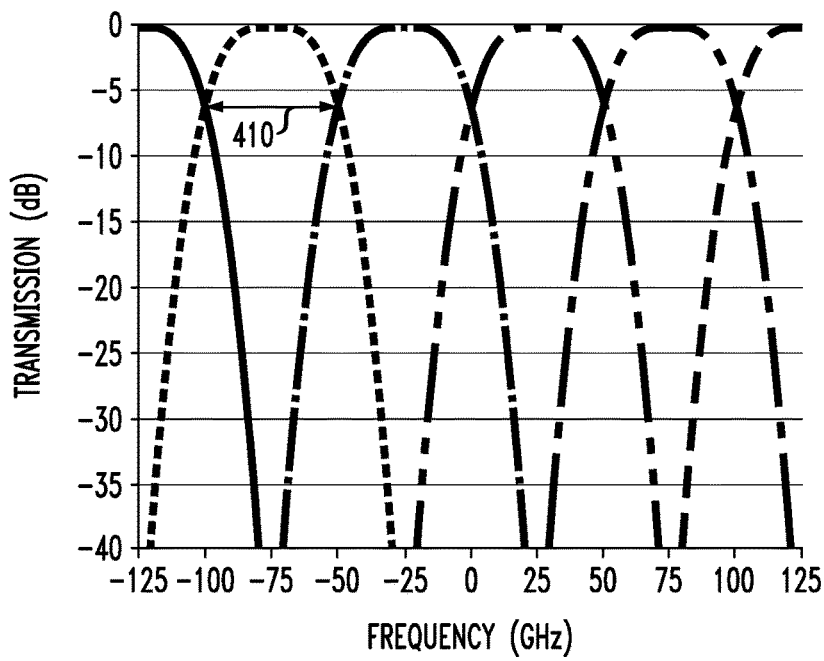
FIG. 4A illustrates non-overlapping transmission bands of the multiplexer and demultiplexer of FIG. 3 as for some embodiments.

FIG. 4A illustrates transmission bands of channels of a typical WSS. The transmission bands are spaced at about 50 GHz intervals, as determined by the center frequencies, coincident with a 50 GHz channel spacing of the DWM wavelength channels. (Those skilled in the pertinent art will appreciate that the horizontal axis scale is transposed relative to a reference channel group center frequency, such that a transmission band at exactly the reference center frequency appears at 0 GHz on the transposed scale.) The width of the transmission bands, e.g. shown as reference 410, is also about 50 GHz, as determined by the −6 dB attenuation points on each band characteristic at which the transmission band characteristics cross. This width is defined for use in this discussion and the claims as the "6 dB bandwidth." This configuration is referred to as "non-overlapping transmission bands", and is often used conventionally to reduce cross-talk between signals propagating in neighboring transmission bands.

Figure 4B:
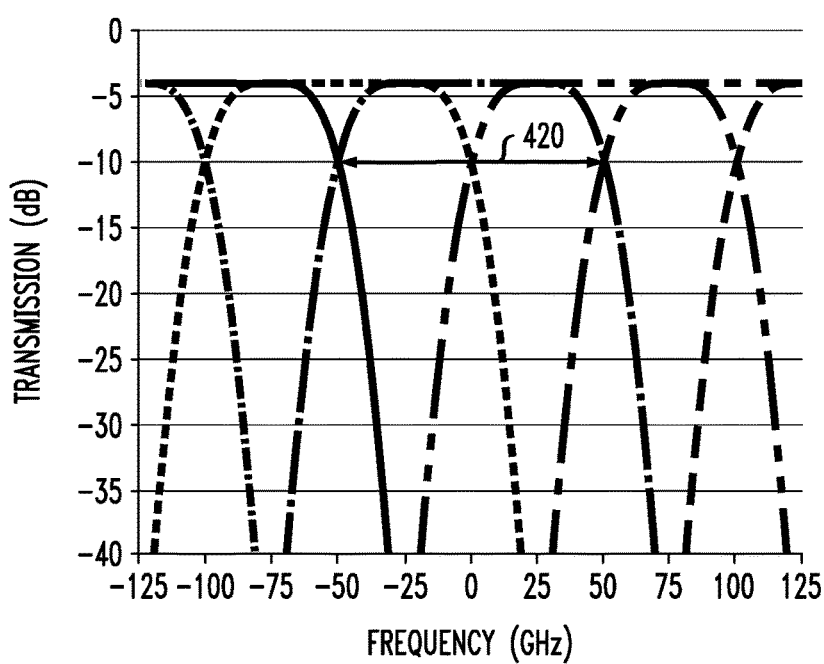
FIG. 4B illustrates overlapping transmission bands of the multiplexer and demultiplexer of FIG. 3 as for some other embodiments.

In contrast, FIG. 4B illustrates a configuration having what are referred to herein as "overlapping transmission bands". Such overlapping transmission bands may be produced by, e.g. introducing an appropriate degree of loss in the WSS, e.g. about −4 dB as illustrated. The transmission bands of the WSSs 310, 320 still have 50 GHz spacing, but have a bandwidth of about 100 GHz, as determined by frequencies at which the band transmission is reduced by about 6 dB relative to the maximum transmissivity and shown as reference 420. In general the transmission bands have a bandwidth of at least about 150% of the band spacing, sometimes preferably at least about 200% of the band spacing, as illustrated. In this example each transmission band has a maximum transmissivity of about −4 dB and intersects its next-nearest neighbor about 6 dB below the maximum transmissivity, e.g. at about −10 dB. Thus the transmission band centered at 0 GHz and the transmission band centered at about 100 GHz intersect at about 50 GHz, and the transmission band centered at 0 GHz and the transmission band centered at about −100 GHz intersect at about −50 GHz. Thus, the 6 dB bandwidth of the transmission bands is about 100 GHz, or about 200% of the channel spacing.

Such overlap of the transmission bands is typically unsuitable for many optical transport applications, such as in ROADMs, due to crosstalk from the adjacent spectral channel. In the present context, however, such overlap is not only tolerable, because of the coherent receiver is capable of rejecting signals resulting from mixing of the adjacent spectral carrier with the local oscillator, but provides the advantage that signals propagating in such a transmission band, e.g. a signal centered at about 0 GHz, is less distorted at the channel band edges. This improved channel signal fidelity advantageously provides increased capacity.

Returning to FIG. 3, in order to guarantee that the receive wavelength is identical to the transmit wavelength on each line card 205 without the need to keep track of fiber routing, and to maintain a plug-and-play spirit, at least one of the two WSSs 310, 320 is configured as a flexible multiplexer, e.g., using a 1×N WSS, where N is the number of wavelength channels in the system. A software-defined networking (SDN) control plane 330, the tunable optical source 220, and the WSS 310 and/or the WSS 320 configured as flexible multiplexers ensure that the same wavelength(s) that are transmitted from a particular line card, e.g. the line card 205, are also received by that same line card. Those skilled in the art will appreciate that an SDN control plane typically includes a distributed network of computing devices that cooperate to provide control functions to a controlled entity such as, in the current example, an optical transport network. Note that without loss of generality FIG. 3 depicts the case of spatial superchannels, in which each line card only transmits a single wavelength but on multiple optical paths. Consequently, the fixed and flexible multiplexers are designed to multiplex S parallel spatial paths onto an S-path output waveguide, which may include, e.g. a fiber bundle, a multi-core fiber, or a multi-mode fiber. Conversion between optical media types from input to output of the fixed or flexible multiplexer is also possible. For example, a line card may receive signals from a multi-core optical fiber and provide signals to a multi-mode optical fiber or ribbon cable via an array connector.

Figure 5:
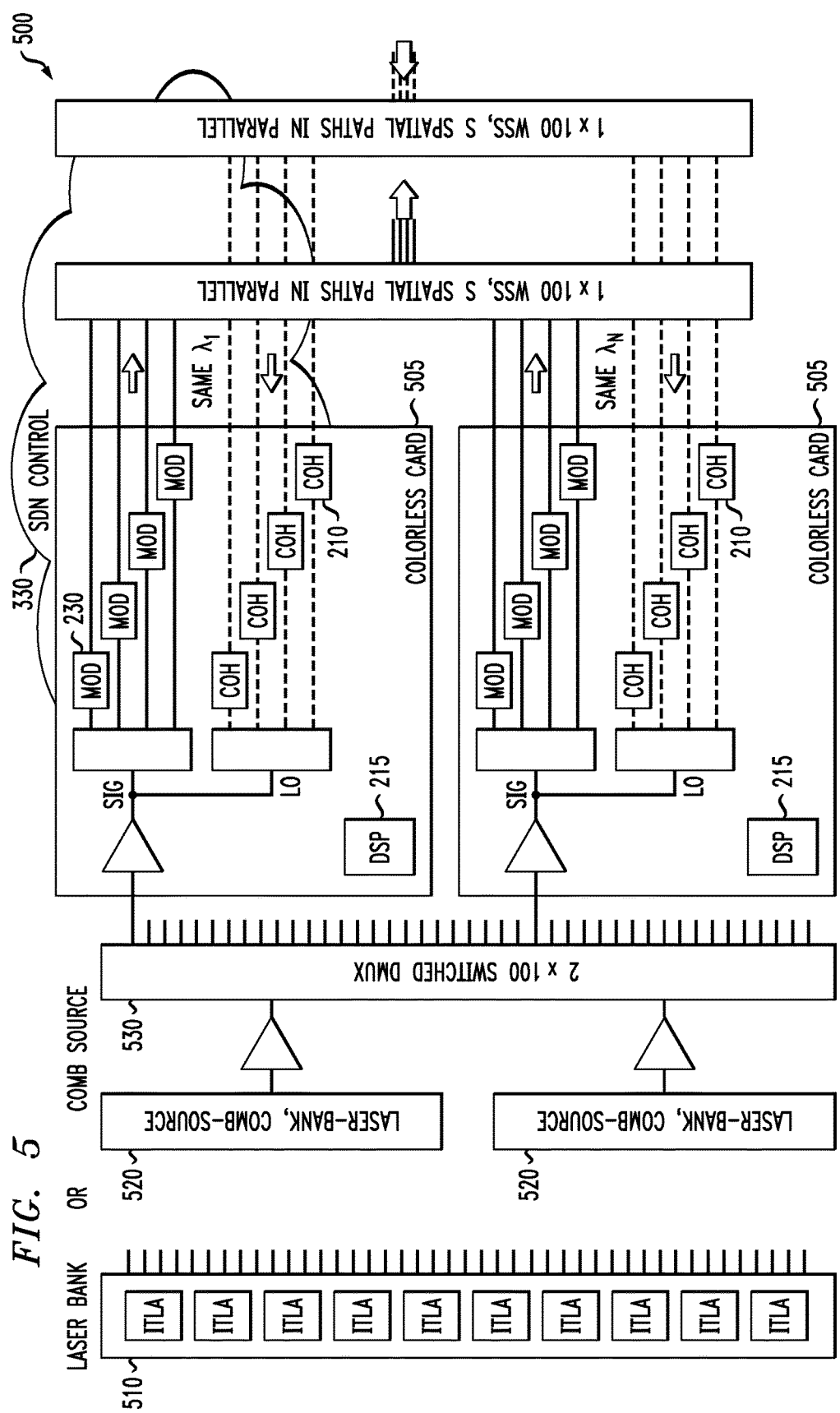
FIG. 5 illustrates an embodiment including a redundant optical source that provides unmodulated (constant-wave, or CW) signals at several wavelengths to each of a corresponding several line cards that do not include on-board optical sources.

FIG. 5 illustrates another example implementation, e.g. a system 500. This embodiment illustrates use of N instances of a line card 505. The line card 505 is similar to the line card 250 previously described, in that the line card 505 also lacks an on-board laser source, and is therefore supplied with an optical carrier from an off-board source. In one embodiment, the source may be a laser bank 510 or other comb source configured to provide N equally spaced wavelengths. Those skilled in the art are acquainted with various types of comb sources.

In another embodiment, two comb sources 520 (laser bank or other comb source) provide redundant signals to a switched 2N MUX 530. In the event of failure of one or more channels of an initially selected comb source 520, the MUX 530 may be operated by a selector to select the other source 520 to preserve overall system functionality. Such a failure may be determined, e.g. by a local one or more power monitors, by detection of failure of one or more of the receivers 210 or modulators 230, or remote detection of failure of one of the channels transmitted by the modulators 230. Such failures may be detected by, e.g. the SDN control plane 330 or the controller 215, either of which may also operate as a selector to control the MUX 530 to switch to the alternate instance of the comb source 520. The MUX 530 can either be implemented as fixed or flexible, depending on whether the egress multiplexers are implemented fixed or flexible. In general, the system may require at least two flexible (de)multiplexers for full plug-and-play functionality.

Figure 6:
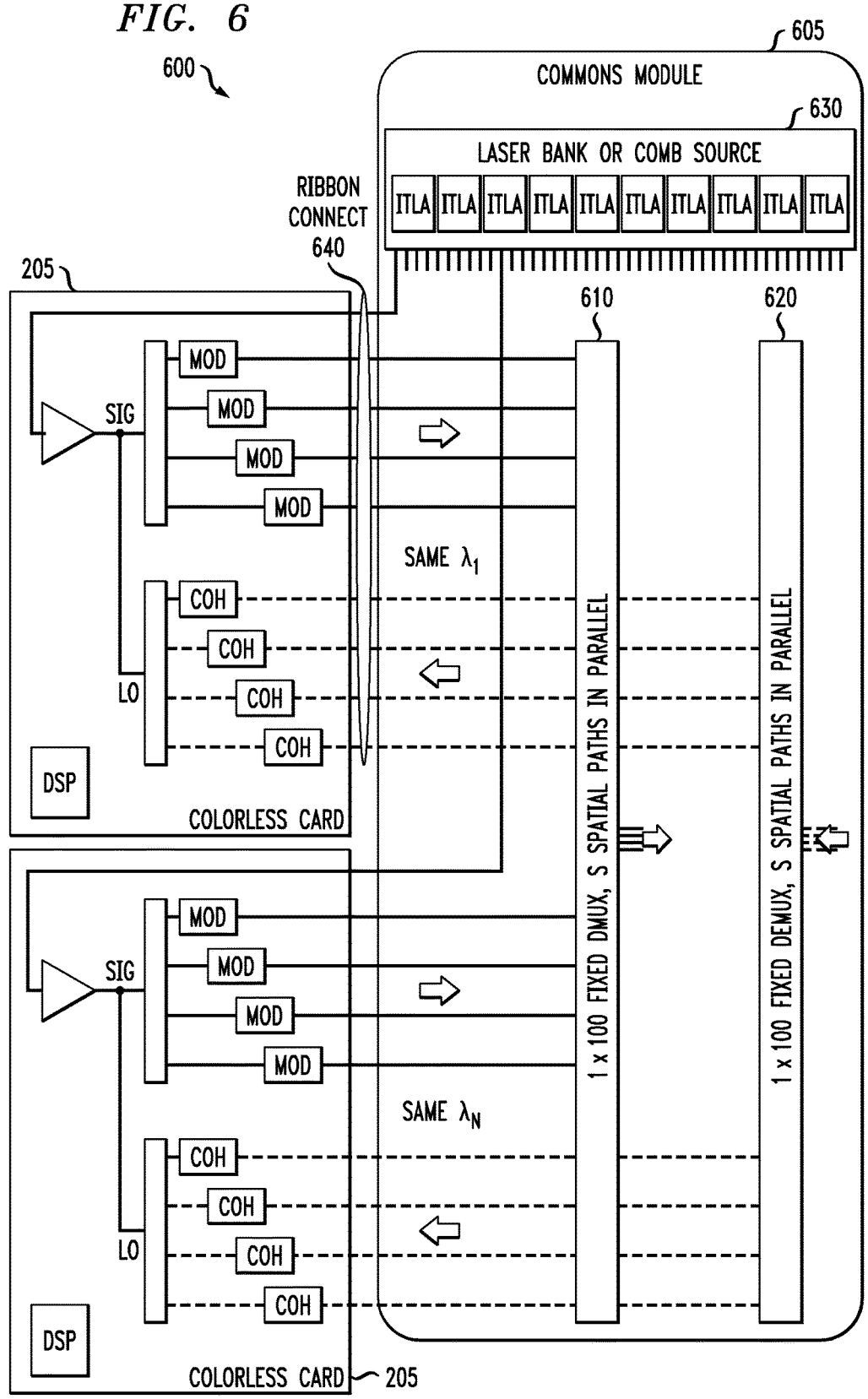
FIG. 6 illustrates an embodiment in which line cards lacking on-board optical sources interface to a commons module that provides optical source signals and mux/demux functions.

FIG. 6 illustrates another embodiment, e.g. a system 600, which includes two N line cards, illustratively shown as instances of the line cards 205, and a commons module 605. No flexible MUXes are needed in the system 600, which instead includes two fixed MUXes 610, 620 on the commons module 605. The commons module 605 also includes an optical source 630 (e.g. a laser bank or demultiplexed comb source(s) as described with respect to FIG. 5), and which is shown without limitation as a laser bank. A single array connector 640 (e.g., a ribbon connector, multi-core fiber connector, or similar connector that preserves connection ordering) connects each aggregate port of the commons module 605 with one instance of the line card 205, thereby ensuring that the correct wavelength(s) are supplied to the line cards 205 for modulation, that modulated signals enter the multiplexer 610 at the correct wavelength, and demultiplexed signals from the multiplexer 620 with the correct wavelength are routed to the correct line card 205. The architecture exemplified by the system 600 provides a mechanism to configure line cards simply in a field setting, e.g. in a data center, without requiring routing and configuration choices that may be prone to error. Moreover, centralization of the optical source 630 consolidates the generation of optical signals to a single system component, reducing costs and simplifying detection and remediation of optical component failures.

Figure 7:
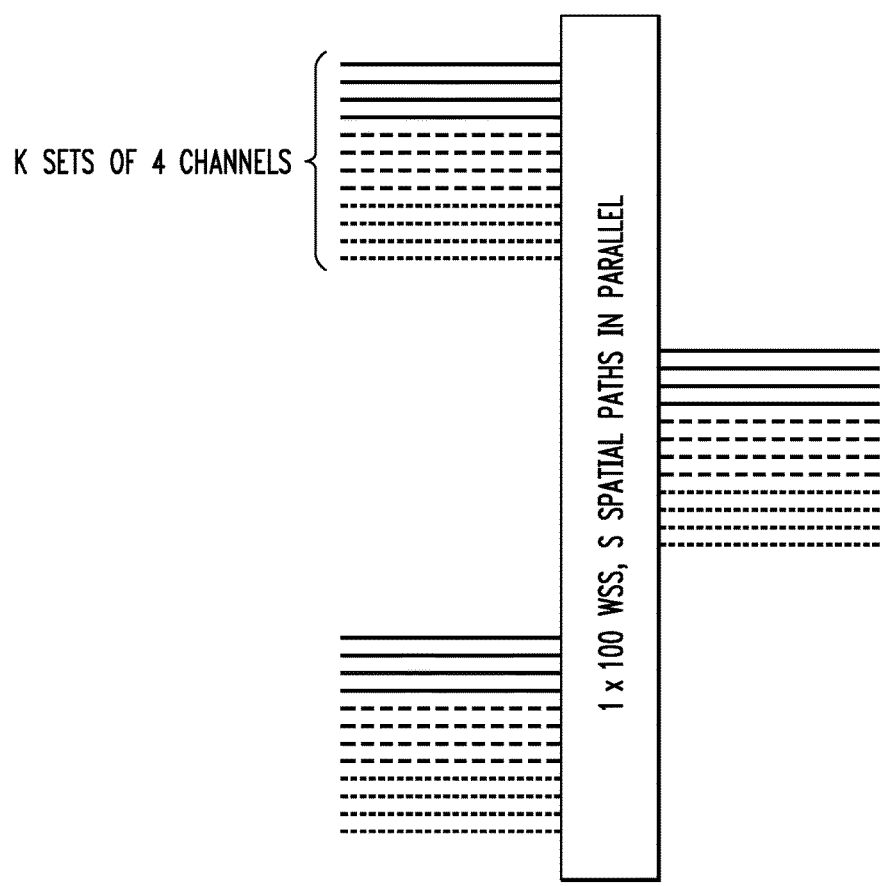
FIG. 7 illustrates a multiplexer configured to wavelength demultiplex K sets of N channels, K>1, to K sets of N channels at each different wavelength, as may be used in various embodiments, e.g. those of FIGS. 3, 5 and 6.

FIG. 7 illustrates path extendibility of architecture of the systems 300, 500 and 600. The components of the commons module (including laser bank or comb source as well as fixed or flexible multiplexers) can be built in a path-extendable manner as shown in FIG. 7. In this figure, a fixed or flexible WSS multiplexer/demultiplexer is configured to provide K sets of S (e.g. 4) parallel paths. Initially unused sets of paths may be used for future upgrades on a set-by-set basis to provide a simple upgrade path to installed infrastructure.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they formally fall within the scope of the claims.

The description and drawings merely illustrate the principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The terms "multiplexer" and "demultiplexer" are used with the understanding that a single component may sometimes be used to provide either function, depending on the direction of data flow through the device. Therefore, in some portions of the description, these terms may be used interchangeably. Moreover, for brevity, the term "multiplexer" may sometimes be abbreviated "MUX" or "mux", and the term "demultiplexer" may sometimes be abbreviated "DEMUX" or "demux".

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, DSP hardware, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, in conjunction with the appropriate computer hardware, the particular technique being selectable by the implementer as more specifically understood from the context.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The invention claimed is:

1. An apparatus, comprising:
a plurality of coherent receivers each being configured to receive a corresponding channel of a received optical superchannel;

a plurality of optical modulators each being configured transmit a corresponding channel of a transmitted optical superchannel;
a plurality of optical splitters each being configured to receive a corresponding one of a plurality of unmodulated optical signals from an optical source external to said apparatus, and direct a first portion of light received by that splitter to a corresponding one of said coherent receivers and a second portion of light received by that splitter to a corresponding one of said optical modulators; and
a processor configured to receive demodulated data from said coherent receivers and to provide data to said optical modulators.

2. The apparatus of claim 1, wherein said coherent receivers are configured to receive said optical superchannel from a demultiplexer having overlapping transmission bands.

3. The apparatus of claim 2, wherein said transmission bands have a 6 dB bandwidth of at least about 150% of a spacing of said transmission bands.

4. The apparatus of claim 1, wherein a wavelength of operation of said modulators and coherent receivers is determined by a software-defined network (SDN) control plane.

5. A method, comprising:
configuring on an optical line card each of a plurality of coherent receivers to receive a corresponding channel of a received optical superchannel;
configuring on said optical line card each of a plurality of optical modulators to transmit a corresponding channel of a transmitted optical superchannel;
configuring on said optical line card each of a plurality of optical splitters to receive a corresponding one of a plurality of unmodulated optical signals from an optical source external to said optical line card, and to direct a first portion of light received by that splitter to a corresponding one of said coherent receivers and a second portion of light received by that splitter to a corresponding one of said optical modulators; and
configuring said optical line card to receive said corresponding channel of said received optical superchannel via an optical wavelength demultiplexer having overlapping transmission bands of optical channels corresponding to said corresponding wavelengths.

6. The method of claim 5, further comprising configuring said coherent receivers to receive said optical superchannel from a demultiplexer having overlapping transmission bands.

7. The method of claim 5, wherein said transmission bands have a 6 dB bandwidth of at least about 150% of a spacing of said transmission bands.

8. The method of claim 5, wherein a wavelength of operation of said modulators and coherent receivers is determined by a software-defined network (SDN) control plane.

9. An apparatus, comprising:
a plurality of coherent receivers each being configured to receive a corresponding channel of a received optical superchannel, said coherent receivers being further configured to receive said optical superchannel from a demultiplexer having overlapping transmission bands;
a plurality of optical modulators each being configured transmit a corresponding channel of a transmitted optical superchannel; and
a plurality of optical splitters each being configured to receive a corresponding one of a plurality of unmodulated optical signals from an optical source external to said apparatus, and direct a first portion of light received by that splitter to a corresponding one of said coherent receivers and a second portion of light received by that splitter to a corresponding one of said optical modulators.

10. The apparatus of claim 9, further comprising a processor configured to receive demodulated data from said coherent receivers and to provide data to said optical modulators.

11. The apparatus of claim 9, wherein said transmission bands have a 6 dB bandwidth of at least about 150% of a spacing of said transmission bands.

12. The apparatus of claim 9, wherein a wavelength of operation of said modulators and coherent receivers is determined by a software-defined network (SDN) control plane.

13. An apparatus, comprising:
a plurality of coherent receivers each being configured to receive a corresponding channel of a received optical superchannel;
a plurality of optical modulators each being configured transmit a corresponding channel of a transmitted optical superchannel; and
a plurality of optical splitters each being configured to receive a corresponding one of a plurality of unmodulated optical signals from an optical source external to said apparatus, and direct a first portion of light received by that splitter to a corresponding one of said coherent receivers and a second portion of light received by that splitter to a corresponding one of said optical modulators,
wherein a wavelength of operation of said modulators and coherent receivers is determined by a software-defined network (SDN) control plane.

14. The apparatus of claim 13, further comprising a processor configured to receive demodulated data from said coherent receivers and to provide data to said optical modulators.

15. The apparatus of claim 13, wherein said coherent receivers are configured to receive said optical superchannel from a demultiplexer having overlapping transmission bands.

16. The apparatus of claim 15, wherein said transmission bands have a 6 dB bandwidth of at least about 150% of a spacing of said transmission bands.

* * * * *